US012695520B2

(12) United States Patent
Hein et al.

(10) Patent No.: US 12,695,520 B2
(45) Date of Patent: Jul. 28, 2026

(54) RECEIVER DECISION FEEDBACK EQUALIZATION CALIBRATION

(71) Applicant: Micron Technology, Inc., Boise, ID (US)

(72) Inventors: Thomas Hein, Munich (DE); Martin Bach, Munich (DE); Miljana Nenadovic, Munich (DE); Hemant Madhewar, Munich (DE); Mani Balakrishnan, Munich (DE); Martin Brox, Munich (DE)

(73) Assignee: Micron Technology, Inc., Boise, ID (US)

( * ) Notice: Subject to any disclaimer, the term of this patent is extended or adjusted under 35 U.S.C. 154(b) by 7 days.

(21) Appl. No.: 18/984,778

(22) Filed: Dec. 17, 2024

(65) Prior Publication Data

US 2025/0226895 A1 Jul. 10, 2025

Related U.S. Application Data

(60) Provisional application No. 63/617,470, filed on Jan. 4, 2024.

(51) Int. Cl.
| | |
|---|---|
| *H04B 1/16* | (2006.01) |
| *H04B 17/21* | (2015.01) |
| *H04L 25/03* | (2006.01) |

(52) U.S. Cl.
CPC ............... *H04B 17/22* (2023.05); *H04B 1/16* (2013.01); *H04L 25/03267* (2013.01)

(58) Field of Classification Search
CPC ...... H04B 17/22; H04B 1/16; H04L 25/03267
USPC .......................................................... 375/219
See application file for complete search history.

(56) References Cited

U.S. PATENT DOCUMENTS

2014/0169426 A1* 6/2014 Aziz ....................... H03F 3/195
375/232

* cited by examiner

*Primary Examiner* — Dominic D Saltarelli
(74) *Attorney, Agent, or Firm* — Holland & Hart LLP

(57) ABSTRACT

Methods, systems, and devices for receiver decision feedback equalization calibration are described. A memory system may support implementing respective decision feedback equalization (DFE) values at respective receivers using interpolation logic. For example, a calibration circuit may generate and store a quantity of candidate voltage values corresponding to the application of different DFE values at the receivers. The memory system may use the interpolation logic to generate (e.g., interpolate, generate) respective voltage values corresponding to a DFE value for application at a respective receiver based on the stored candidate voltage values. The interpolation logic may output the voltage values via a serial bus to each receiver, and each receiver may apply, to respectively received data, a DFE value corresponding to a respectively received voltage value.

24 Claims, 6 Drawing Sheets

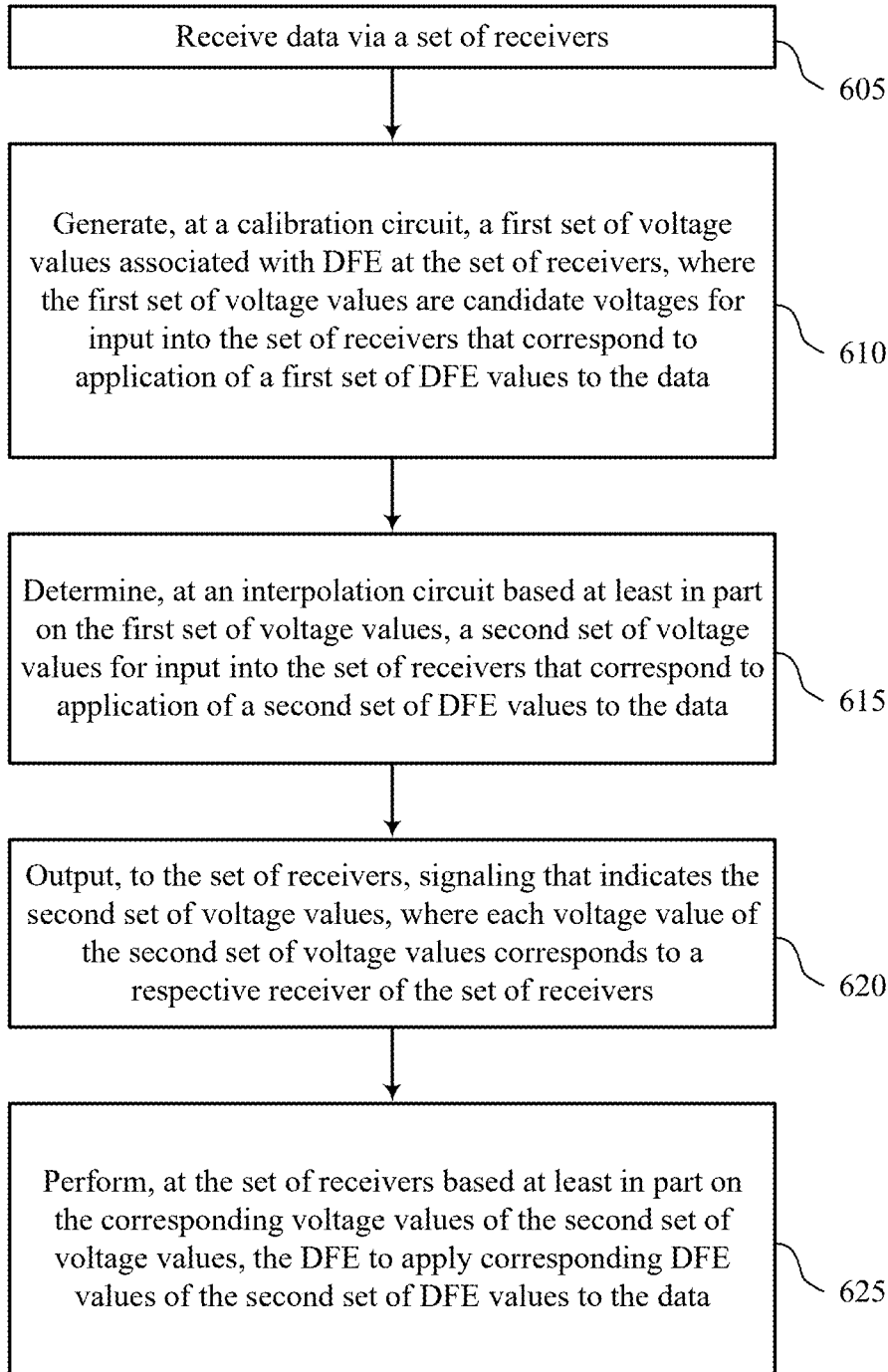

Receive data via a set of receivers

605

Generate, at a calibration circuit, a first set of voltage values associated with DFE at the set of receivers, where the first set of voltage values are candidate voltages for input into the set of receivers that correspond to application of a first set of DFE values to the data

610

Determine, at an interpolation circuit based at least in part on the first set of voltage values, a second set of voltage values for input into the set of receivers that correspond to application of a second set of DFE values to the data

615

Output, to the set of receivers, signaling that indicates the second set of voltage values, where each voltage value of the second set of voltage values corresponds to a respective receiver of the set of receivers

620

Perform, at the set of receivers based at least in part on the corresponding voltage values of the second set of voltage values, the DFE to apply corresponding DFE values of the second set of DFE values to the data

RECEIVER DECISION FEEDBACK EQUALIZATION CALIBRATION

CROSS REFERENCE

The present Application for Patent claims priority to U.S. Patent Application No. 63/617,470 by Hein et al., entitled "RECEIVER DECISION FEEDBACK EQUALIZATION CALIBRATION," filed Jan. 4, 2024, which is assigned to the assignee hereof, and which is expressly incorporated by reference in its entirety herein.

TECHNICAL FIELD

The following relates to one or more systems for memory, including receiver decision feedback equalization (DFE) calibration.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells.

BRIEF DESCRIPTION OF THE DRAWINGS

FIG. 6 shows a flowchart illustrating a method or methods that support receiver DFE calibration in accordance with examples as disclosed herein.

DETAILED DESCRIPTION

Figure 1:
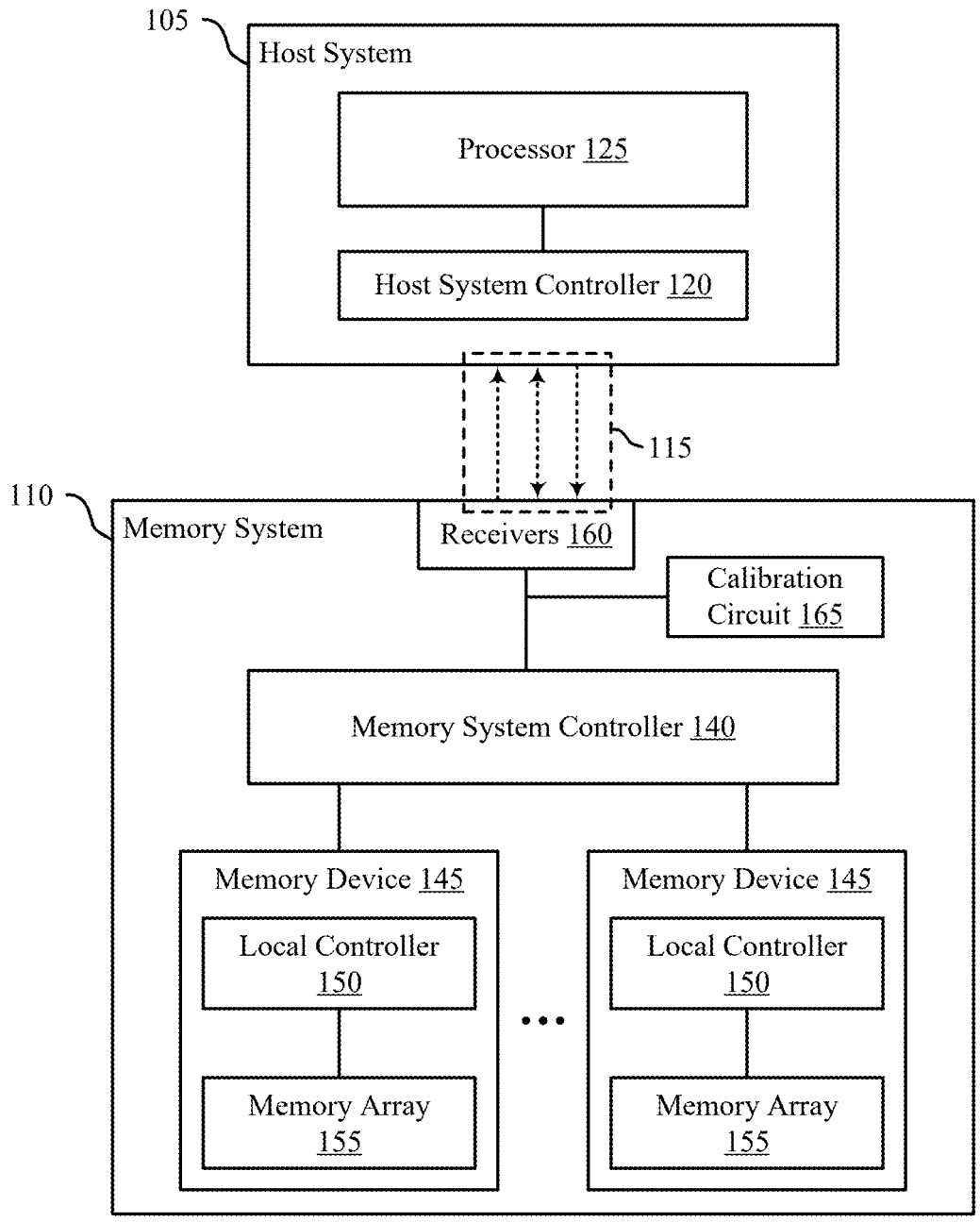
FIG. 1 shows an example of a system that supports receiver decision feedback equalization (DFE) calibration in accordance with examples as disclosed herein.

A memory system may include one or more data receivers which may be configured to receive data (e.g., from a host device) via one or more data channels (e.g., DQs). In some examples, a receiver may be configured to perform decision feedback equalization (DFE) on data received via a respective data channel. The DFE may be based on one or more data bits previously received by the receiver. For example, in a direct 1-tap DFE implementation, the DFE performed by the receiver is based on a value of one previously received bit at the receiver.

In some cases, DFE implementations may be impacted by conditions of the memory system. For example, a voltage of the memory system, a temperature of the memory system, or process variations at the memory system may impact the accuracy of the DFE performed at each receiver. In some systems (e.g., double data rate (DDR) systems, graphics DDR (GDDR) systems), DFE may be implemented by inputting a voltage (e.g., a control voltage) into one or more samplers (e.g., slicers) of the receiver, where a value of the DFE applied by the receiver (e.g., a quantity of inter-symbol interference subtracted from a data signal) depends on the value of the control voltage (e.g., the greater the control voltage the greater the DFE value). In some cases, control voltages may be generated at a calibration circuit (e.g., a replica circuit) for input to the receivers to adjust (e.g., compensate) for process, voltage, temperature (PVT) variations at the memory system. For example, PVT variations may cause there to be a non-linear relationship between increasing control voltages input into a receiver and the DFE value applied by the receiver. A calibration circuit of the memory system may imitate conditions (e.g., processes, temperature, voltage) of a receiver of the memory system to determine which control voltages result in the application of which DFE values, which may allow for adjustment of the DFE based on the conditions at the calibration circuit.

In some cases, the calibration circuit may be limited to supporting implementation of a single DFE value at a time, for example, by determining the control voltage corresponding to the single DFE value, which control voltage is then output to the receivers. It may be desirable for each receiver to support implementing a respective DFE value to be able to adjust each receiver separately to improve DFE performance. However, including one or more calibration circuits for each receiver at a memory system may be costly in terms of power consumption, current consumption, and/or space.

In accordance with examples as described herein, a memory system may support implementing respective DFE values for respective receivers using interpolation logic associated with (e.g., coupled with, included at) one or more calibration circuits. For example, a calibration circuit may generate and store a quantity of candidate voltage values (e.g., candidate control voltage values) corresponding to respective DFE values. The memory system may use the interpolation logic to generate respective voltage values corresponding to a DFE value for a respective receiver. For example, the memory system may include registers corresponding to the receivers and that indicate a respective DFE value for application by the corresponding receiver. The interpolation logic may generate voltage values corresponding to the respectively indicated DFE values, for example, by using the candidate voltage values to interpolate a voltage value corresponding to an indicated DFE value or by selecting a candidate voltage value corresponding to an indicated DFE value. In some examples, the interpolation logic may output the voltage values via a serial bus to each receiver, and each receiver may generate a corresponding control voltage (e.g., using a digital-to-analog converter (DAC)) for input into one or more samplers of the receiver. Accordingly, by supporting the interpolation or selection of voltage values generated by the calibration circuit, the memory system may support each receiver to apply respective DFE values to respectively received data, which may improve receiver reliability and support faster read speeds at the memory device.

In addition to applicability in memory systems as described herein, techniques for calibrating DFE at a receiver may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by improving memory access speed and reliability, for example, by enabling independent DFE application at each receiver that is calibrated to compensate for PVT variations. Such techniques may decrease processing or latency times, improve response times, or otherwise improve user experience, among other benefits.

Features of the disclosure are illustrated and described in the context of systems and architectures. Features of the disclosure are further illustrated and described in the context of receiver diagrams, signaling diagrams, calibration circuits, and flowcharts.

FIG. 1 illustrates an example of a system 100 that supports receiver DFE calibration in accordance with examples as disclosed herein. The system 100 may include portions of an electronic device, such as a computing device, a mobile computing device, a wireless communications device, a graphics processing device, a vehicle, a smartphone, a wearable device, an internet-connected device, a vehicle controller, a system on a chip (SoC), or other stationary or portable electronic system, among other examples. The system 100 includes a host system 105, a memory system 110, and one or more channels 115 coupling the host system 105 with the memory system 110 (e.g., to support a communicative coupling). The system 100 may include any quantity of one or more memory systems 110 coupled with the host system 105.

The host system 105 may include one or more components (e.g., circuitry, processing circuitry, one or more processing components) that use memory to execute processes, any one or more of which may be referred to as or be included in a processor 125. The processor 125 may include at least one of one or more processing elements that may be co-located or distributed, including a general-purpose processor, a digital signal processor (DSP), an application-specific integrated circuit (ASIC), a field-programmable gate array (FPGA) or other programmable logic device, a controller, discrete gate or transistor logic, one or more discrete hardware components, or a combination thereof. The processor 125 may be an example of a central processing unit (CPU), a graphics processing unit (GPU), a general-purpose GPU (GPGPU), or an SoC or a component thereof, among other examples.

The host system 105 may also include at least one of one or more components (e.g., circuitry, logic, instructions) that implement the functions of an external memory controller (e.g., a host system memory controller), which may be referred to as or be included in a host system controller 120. For example, a host system controller 120 may issue commands or other signaling for operating the memory system 110, such as write commands, read commands, configuration signaling or other operational signaling. In some examples, the host system controller 120, or associated functions described herein, may be implemented by or be part of the processor 125. For example, a host system controller 120 may be hardware, instructions (e.g., software, firmware), or some combination thereof implemented by the processor 125 or other component of the host system 105. In various examples, a host system 105 or a host system controller 120 may be referred to as a host.

The memory system 110 provides physical memory locations (e.g., addresses) that may be used or referenced by the system 100. The memory system 110 may include a memory system controller 140 and one or more memory devices 145 (e.g., memory packages, memory dies, memory chips) operable to store data. The memory system 110 may be configurable for operations with different types of host systems 105, and may respond to commands from the host system 105 (e.g., from a host system controller 120). For example, the memory system 110 (e.g., a memory system controller 140) may receive a write command indicating that the memory system 110 is to store data received from the host system 105, or receive a read command indicating that the memory system 110 is to provide data stored in a memory device 145 to the host system 105, or receive a refresh command indicating that the memory system 110 is to refresh data stored in a memory device 145, among other types of commands and operations.

A memory system controller 140 may include at least one of one or more components (e.g., circuitry, logic, instructions) operable to control operations of the memory system 110. A memory system controller 140 may include hardware or instructions that support the memory system 110 performing various operations, and may be operable to receive, transmit, or respond to commands, data, or control information related to operations of the memory system 110. A memory system controller 140 may be operable to communicate with one or more of a host system controller 120, one or more memory devices 145, or a processor 125. In some examples, a memory system controller 140 may control operations of the memory system 110 in cooperation with the host system controller 120, a local controller 150 of a memory device 145, or any combination thereof. Although the example of memory system controller 140 is illustrated as a separate component of the memory system 110, in some examples, aspects of the functionality of the memory system 110 may be implemented by a processor 125, a host system controller 120, at least one of one or more local controllers 150, or any combination thereof.

Each memory device 145 may include a local controller 150 and one or more memory arrays 155. A memory array 155 may be a collection of memory cells (e.g., a two-dimensional array, a three-dimensional array), with each memory cell being operable to store data (e.g., as one or more stored bits). Each memory array 155 may include memory cells of various architectures, such as random access memory (RAM) cells, dynamic RAM (DRAM) cells, synchronous dynamic RAM (SDRAM) cells, static RAM (SRAM) cells, ferroelectric RAM (FeRAM) cells, magnetic RAM (MRAM) cells, resistive RAM (RRAM) cells, phase change memory (PCM) cells, chalcogenide memory cells, not-or (NOR) memory cells, and not-and (NAND) memory cells, or any combination thereof.

A local controller 150 may include at least one of one or more components (e.g., circuitry, logic, instructions) operable to control operations of a memory device 145. In some examples, a local controller 150 may be operable to communicate (e.g., receive or transmit data or commands or both) with a memory system controller 140. In some examples, a memory system 110 may not include a memory system controller 140, and a local controller 150 or a host system controller 120 may perform functions of a memory system controller 140 described herein. In some examples, a local controller 150, or a memory system controller 140, or both may include decoding components operable for accessing addresses of a memory array 155, sense components for sensing states of memory cells of a memory array 155, write components for writing states to memory cells of a memory array 155, or various other components operable for supporting described operations of a memory system 110.

A host system 105 (e.g., a host system controller 120) and a memory system 110 (e.g., a memory system controller 140) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, a conductive path) between terminals (e.g., nodes, pins, contacts) associated with the components of the system 100. A terminal may be an example of a conductive input or output point of a device of the system 100, and a terminal may be operable as part of a channel 115. To support communications over channels 115, a host system 105 (e.g., a host system controller 120) and a memory system 110 (e.g., a memory system controller 140) may include receivers (e.g., latches) for receiving signals, transmitters (e.g., drivers) for transmitting signals, decoders for decoding or demodulating received signals, or encoders for encoding or modulating signals to be transmitted, among other components that support signaling over channels 115, which may be included in a respective interface portion of the respective system.

A channel 115 be dedicated to communicating one or more types of information, and channels 115 may include unidirectional channels, bidirectional channels, or both. For example, the channels 115 may include one or more command/address channels, one or more clock signal channels, one or more data channels, among other channels or combinations thereof. In some examples, a channel 115 may be configured to provide power from one system to another (e.g., from the host system 105 to the memory system 110, in accordance with a regulated voltage). In some examples, at least a subset of channels 115 may be configured in accordance with a protocol (e.g., a logical protocol, a communications protocol, an operational protocol, an industry standard), which may support configured operations of and interactions between a host system 105 and a memory system 110.

A command/address channel (e.g., a CA channel) may be operable to communicate commands between the host system 105 and the memory system 110, including control information associated with the commands (e.g., address information, configuration information). Commands carried by a command/address channel may include a write command with an address for data to be written to the memory system 110 or a read command with an address of data to be read from the memory system 110.

A clock signal channel may be operable to communicate one or more clock signals between the host system 105 and the memory system 110. Clock signals may oscillate between a high state and a low state, and may support coordination (e.g., in time) between operations of the host system 105 and the memory system 110. In some examples, a clock signal may provide a timing reference for operations of the memory system 110. A clock signal may be referred to as a control clock signal, a command clock signal, or a system clock signal. A system clock signal may be generated by a system clock, which may include one or more hardware components (e.g., oscillators, crystals, logic gates, transistors).

A data channel (e.g., a DQ channel) may be operable to communicate (e.g., bidirectionally) information (e.g., data, control information) between the host system 105 and the memory system 110. For example, a data channel may communicate information from the host system 105 to be written to the memory system 110, or information read from the memory system 110 to the host system 105. In some examples, channels 115 may include one or more error detection code (EDC) channels. An EDC channel may be operable to communicate error detection signals, such as checksums or parity bits, which may accompany information conveyed over a data channel. In some examples, receivers 160 of the memory system 110 may be configured to receive data communicated via respective data channels of the channels 115. In some examples, the receivers 160 may be configured to perform DFE on data received via respective data channels. The DFE may be based on one or more data bits previously received by a receiver 160. For example, a receiver 160 may implement direct 1-tap DFE, in which the DFE performed by the receiver 160 is based on a value of one previously received bit at the receiver 160.

In some cases, DFE procedures may be impacted by conditions of the memory system 110. For example, PVT variations associated with the memory system 110 (e.g., the receivers 160) may impact the efficacy and accuracy of the DFE performed at each receiver 160. In some systems (e.g., DDR systems, GDDR or GDDR7 systems), one or more calibration circuits 165 (e.g., replica circuits) may be used to generate control voltages for input to the receivers 160 to adjust (e.g., compensate) for the PVT variations. For example, a calibration circuit 165 may imitate conditions (e.g., processes, temperature, voltage) of the receivers 160 of the memory system 110, such as by being located within a relatively close proximity to the receivers 160, which may allow for adjustment of the DFE based on the conditions at the calibration circuit 165. In some cases, the calibration circuit 165 may be limited to supporting implementation of a single DFE value across all the receivers 160 at a time, but it may be desirable to implement different DFE values at each receiver 160 separately to improve DFE performance. However, implementing one or more calibration circuits 165 for each receiver 160 may be costly in terms of power consumption and space at the memory system 110.

In accordance with examples as described herein, the memory system 110 may support implementing respective DFE values for respective receivers using interpolation logic associated with (e.g., coupled with, included at) one or more calibration circuits 165. For example, a calibration circuit 165 may generate and store a quantity of candidate voltage values (e.g., candidate control voltage values) corresponding to respective DFE values. The memory system 110 may use the interpolation logic to generate respective voltage values corresponding to a DFE value for a respective receiver 160. For example, the memory system may include registers corresponding to the receivers and that indicate a respective DFE value for application by the corresponding receiver 160. The interpolation logic may generate voltage values corresponding to the respectively indicated DFE values, for example, by using the candidate voltage values to interpolate a voltage value corresponding to an indicated DFE value or by selecting a candidate voltage value corresponding to an indicated DFE value. In some examples, the interpolation logic may output the voltage values via a serial bus to each receiver 160, and each receiver 160 may generate a corresponding control voltage (e.g., using a DAC) for input into one or more samplers of the receiver 160. Accordingly, by supporting the interpolation and/or selection of voltage values generated by the calibration circuit, the memory system 110 may support each receiver to apply respective DFE values to respectively received data, which may improve receiver reliability and support faster read speeds at the memory device.

Figure 2:
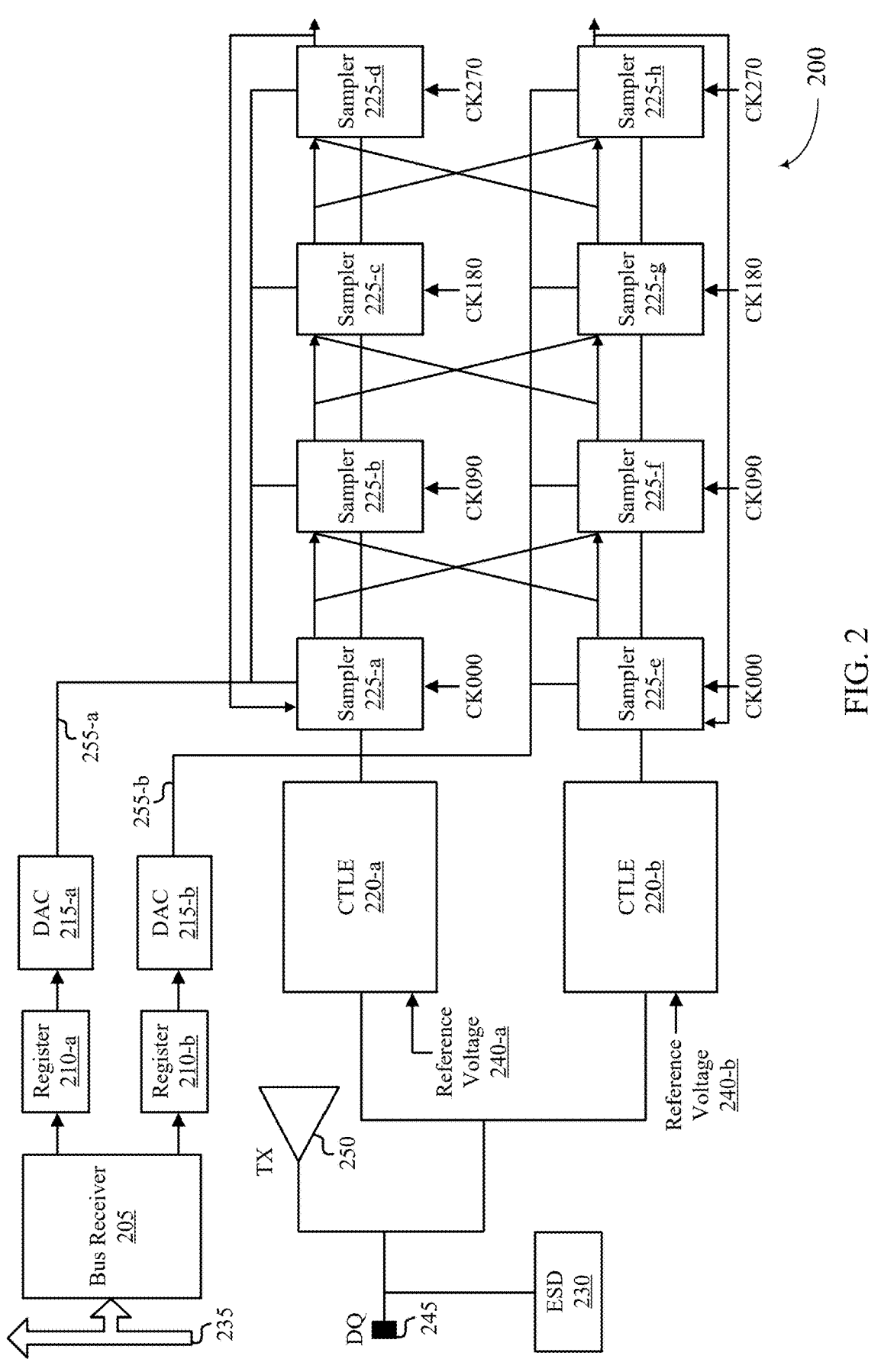
FIG. 2 shows an example of a receiver diagram that supports receiver DFE calibration in accordance with examples as disclosed herein.

FIG. 2 shows an example of a receiver diagram 200 that supports receiver DFE calibration in accordance with examples as disclosed herein. The receiver diagram 200 illustrates receiver circuitry that may be included within a memory system, such as the memory system 110 as described with reference to FIG. 1. For example, a memory system may implement multiple receivers (e.g., receivers 160), each including similar circuitry to that depicted with respect to the receiver diagram 200. The receiver diagram 200 illustrates receiver circuitry for a memory system implementing three-level pulse amplitude modulation techniques (e.g., PAM3), though the concepts illustrated by the receiver diagram 200 may be applied to other modulation techniques.

The receiver diagram 200 supports receiving data via a data channel 245 (e.g., a DQ). In some examples, the receiver diagram 200 may include an electrostatic discharge (ESD) component 230, which may protect elements of the receiver circuitry from a large current spike receiver, for example, via a data channel 245. In some cases, a receiver may also include a transmit component 250, which may allow the receiver to output signaling via the data channel 245.

In some examples, a bit value (e.g., modulation level) represented by an analog signal received via the data channel 245 may be affected by a previously received bit value via the data channel 245. For example, a voltage corresponding the previous bit value may affect the current voltage of the analog signal at the data channel 245, which may create difficulty for the receiver to determine to which bit value the current voltage corresponds. For instance, in a PAM3 scheme, an analog signal may represent one of three values (e.g., 1, 0, and −1) corresponding to three voltage values (e.g., high, zero, and low) for the analog signal, defined using a high reference voltage and a low reference voltage. In some cases, if the analog signal is to indicate a value of 1, followed by a value of −1, the analog signal may shift from a high voltage value to a low voltage value. However, the analog signal may not achieve a low voltage value in accordance with the low reference voltage within a sample time for the receiver, and the receiver may incorrectly read the value as a 0 value.

To avoid (e.g., reduce the likelihood of) incorrect readings (e.g., decoding) of the analog signal, equalization such as DFE and/or continuous time linear equalization (CTLE) may be performed by the receiver. The analog signal received via the data channel 245 may be input into a CTLE component 220-a and a CTLE component 220-b. Each CTLE component 220 may perform linear equalization for the analog signal. The CTLE component 220-a may be associated with a high signal and may receive a reference voltage 240-a corresponding to the high reference voltage (e.g., for PAM3). Conversely, the CTLE component 220-b may be associated with a low signal and may receive a reference voltage 240-b corresponding to a low reference voltage (e.g., for PAM3). The output of the CTLE components 220 may be input into a chain of samplers 225, which may perform DFE (e.g., apply a DFE value to the signals output by the CTLE components 220).

For example, the receiver diagram 200 may include a set of high samplers 225 (e.g., including a sampler 225-a, a sampler 225-b a sampler 225-c, and a sampler 225-d) and a set of low samplers 225 (e.g., including a sampler 225-e, a sampler 225-f, a sampler 225-g, and a sampler 225-h) to perform DFE. Each sampler 225 may be configured to sample an analog signal and perform DFE based on one or more previously received bit values (e.g., via the data channel 245). In some examples, each sampler 225 may receive different clock signals (e.g., CK000, CK090, CK180, CK270). The high samplers 225 may perform DFE based on a high DFE control voltage 255-a, while the low samplers 225 may perform DFE based on a low DFE control voltage 255-b. For example, a DFE value applied by the receiver may increase as the control voltages 255 increase. As such, the receiver may apply a DFE value to received data based on the DFE control voltages 255.

In some cases, DFE procedures may be impacted by conditions of the memory system. For example, PVT variations at the memory system may impact the efficacy and/or accuracy of the DFE performed at each receiver. As such, the DFE control voltages 255 may be generated by a calibration circuit to adjust for the conditions of the memory system. In some examples, it may be beneficial to apply different DFE values at each receiver. As such, techniques for implementing respective DFE control voltages 255 at respective receivers may be desired.

In accordance with examples as described herein, the receiver may receive an indication (e.g., a digital indication) of control voltage values corresponding to the high DFE control voltage 255-a and the low DFE control voltage 255-b via a bus receiver 205. For example, the bus receiver 205 may receive the voltage values via a serial bus 235, which may serially carry signals indicating voltage values corresponding to each receiver of a memory system. In accordance with examples described herein, the voltage values may be output onto the serial bus by respective interpolation logic of one or more calibration circuits.

The bus receiver 205 may obtain (e.g., decode) the voltage values corresponding to the receiver and the voltage values may be stored (e.g., latched) to one or more registers 210, such as a register 210-a (e.g., for the high DFE control voltage 255-a) and a register 210-b (e.g., for the low DFE control voltage 255-b). In some examples, the voltage values transmitted via the serial bus 235 may include or be transmitted with an indication (e.g., identifier) to which receiver the voltage values correspond. As such, the bus receiver 205 may decode the signals indicating the voltage values that correspond to the receiver, while refraining from decoding signals indicating voltage values corresponding to other receivers of the memory system.

In some examples, the receiver may generate the high DFE control voltage 255-a using a DAC 215-a, which may generate the high DFE control voltage 255-a based on a digital indication of the corresponding voltage value received via the bus receiver 205. For example, the register 210-a may output an indication of a value of the high DFE control voltage 255-a to the DAC 215-a, which may generate the high DFE control voltage 255-a. Similarly, the receiver may generate the low DFE control voltage 255-b using a DAC 215-b, which may generate the low DFE control voltage 255-b based on a digital indication (e.g., from the register 210-b) of the corresponding voltage value received via the bus receiver 205. As such, the DAC 215-a and the DAC 215-b may output the respective control voltages 255 to the high samplers 225 (e.g., the sampler 225-a, the sampler 225-b, the sampler 225-c, and the sampler 225-*d*) or the low samplers 225 (e.g., the sampler 225-*e*, the sampler 225-*f*, the sampler 225-*g*, and the sampler 225-*h*), respectively.

Figure 3:
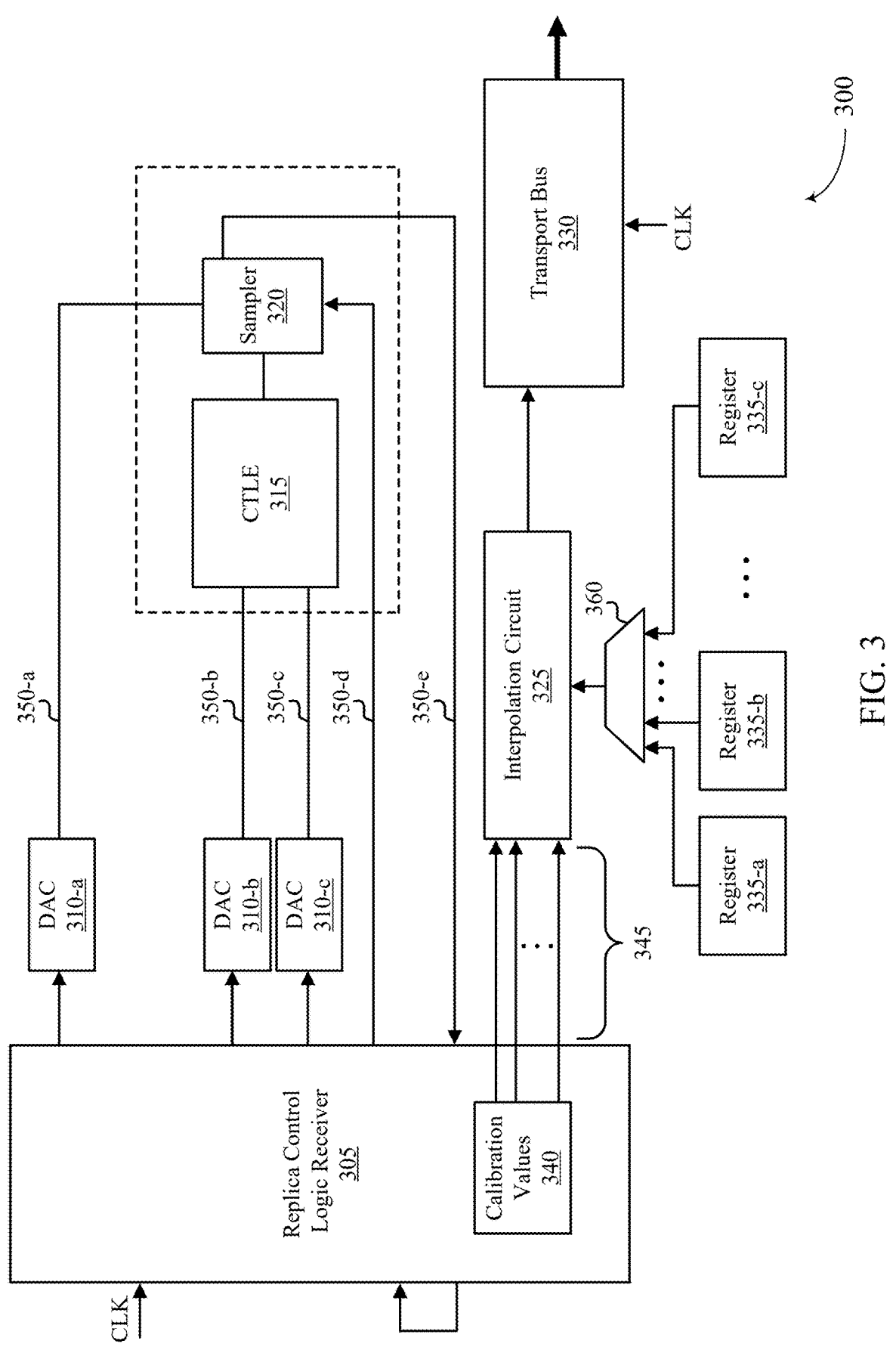
FIG. 3 shows an example of a calibration circuit that supports receiver DFE calibration in accordance with examples as disclosed herein.
Figure 4:
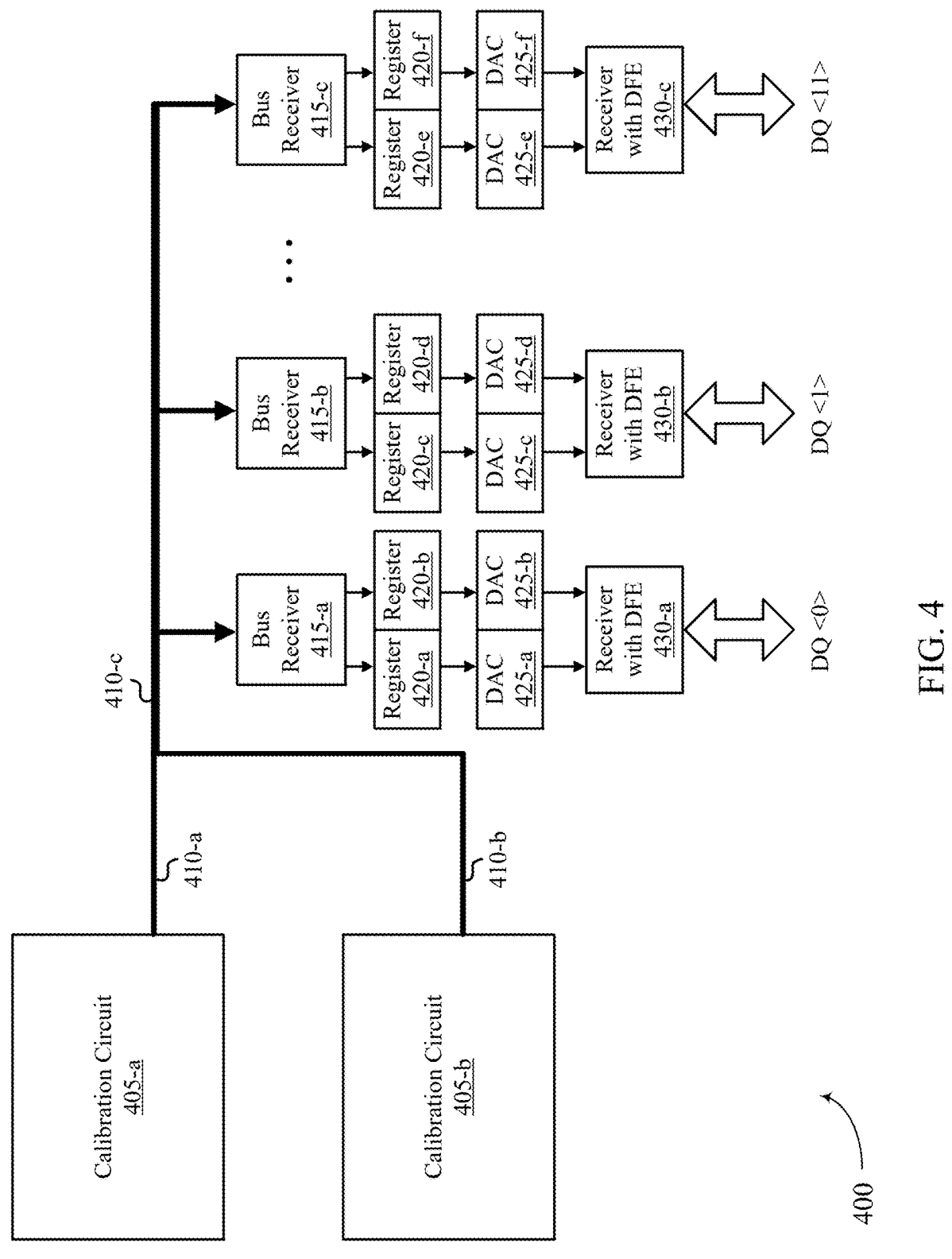
FIG. 4 shows an example of a signaling diagram that supports receiver DFE calibration in accordance with examples as disclosed herein.

Accordingly, the receiver may perform DFE according to voltage values generated by one or more calibration circuits, as described herein, including with reference to FIGS. 3 and 4.

FIG. 3 shows an example of a calibration circuit 300 that supports receiver DFE calibration in accordance with examples as disclosed herein. The calibration circuit 300 (e.g., a replica circuit) may support outputting voltage values to multiple receivers of a memory system (e.g., such as the memory system 110) for performing DFE. In some examples, the memory system may include more than one calibration circuit 300. For example, the memory system may include a first calibration circuit 300 for generating voltage values corresponding to respective high DFE control voltages (e.g., the high DFE control voltages 255-*a*) at the receivers and a second calibration circuit 300 for generating voltage values corresponding to respective low DFE control voltages (e.g., the low DFE control voltages 255-*b*) at the receivers.

In some cases, DFE procedures may be impacted by conditions of the memory system. For example, PVT variations at the memory system may impact the efficacy and/or accuracy of the DFE performed at each receiver, for example, by causing a non-linear relationship between increasing control voltages 255 and increasing DFE values applied at a receiver. A calibration circuit may imitate conditions (e.g., processes, temperature, voltage) of a receiver of the memory system, which may allow for adjustment of the DFE based on the current conditions at the calibration circuit.

In accordance with examples as described herein, the memory system may implement the calibration circuit 300 for generating candidate voltage values (e.g., values of control voltages 255) corresponding to different DFE values. In some examples, the calibration circuit may be implemented physically near the receivers, such that conditions (e.g., voltage, temperature, processes) at the calibration circuit 300 are similar to those at the receivers.

In some examples, the calibration circuit 300 may implement a feedback loop such that the calibration circuit 300 may determine which DFE control voltages (e.g., V_DFE values) result in a desired DFE value (e.g., a DFE setting) to be implemented at (e.g., applied by) the receivers. For example, a replica control logic receiver 305 may output a digital value to a DAC 310-*a* corresponding to a DFE control voltage, and the DAC 310-*a* may generate the DFE control voltage to input into a sampler 320 (e.g., a DFE sampler) via a line 350-*a*. The replica control logic receiver 305 may also indicate a value corresponding to a reference voltage to the DAC 310-*c*, which may generate the reference voltage to be input into a CTLE component 315 via a line 350-*c*.

The sampler 320 may perform DFE and provide feedback to the replica control logic receiver 305 via a line 350-*e*. The replica control logic receiver 305 may indicate a value of a voltage as output by the sampler 320 to the DAC 310-*b*. This value may correspond to the reference voltage and any effects caused by the DFE performed by the sampler 320 based on the DFE control voltage. As such, the DAC 310-*b* may output a voltage corresponding to the reference voltage affected by DFE, which may be input back into the sampler 320 via a line 350-*b*. Accordingly, the replica control logic receiver 305 may adjust a value of the DFE control voltage input into the sampler (e.g., via the line 350-*a*) based on feedback provided by the sampler 320 (e.g., via the line 350-*d*).

The replica control logic receiver 305 may store determined DFE control voltage values as calibration values 340 (e.g., which may be referred to as candidate voltage values). For example, the replica control logic receiver 305 may store a minimum calibration value (e.g., corresponding to a lowest DFE control voltage value that may be used by the receivers) and a maximum calibration value (e.g., corresponding to a lowest DFE control voltage value that may be used by the receivers). In some examples, the calibration values 340 may also include one or more intermediate values between the minimum and the maximum value. A larger quantity of calibration values 340 (e.g., candidate values) may lead to more precise interpolation but may be associated with a longer calibration period to generate the calibration values 340 and/or a larger storage capacity of the calibration circuit 300.

To output respective DFE control voltage values to respective receivers, the calibration circuit 300 may use register values from one or more registers 335 (e.g., mode registers), each register 335 corresponding to a respective receiver. For example, a register 335-*a* may indicate a DFE value corresponding to (e.g., for application at) a first receiver, a register 335-*b* may indicate a DFE value corresponding to a second receiver, and register 335-*c* may indicate a DFE value corresponding to a third receiver, and so forth for additional receivers of the memory system.

The calibration circuit 300 may use an interpolation circuit 325 to generate indications of respective DFE control voltage values corresponding to each DFE values indicated by each respective register 335. In some examples, the interpolation circuit 325 may be included in the calibration circuit 300. In some examples, the interpolation circuit 325 may be coupled with the calibration circuit 300, and the calibration circuit 300 may include the replica control logic receiver 305, the DACs 310, the CTLE component 315, and the sampler 320. The DFE values indicated by the registers 335 may be multiplexed via a multiplexer 360, which may use a select signal (e.g., a DQ select signal, a control signal) to determine which DFE value to indicate to the interpolation circuit 325. The interpolation circuit 325 may obtain one or more of the calibration values 340 (e.g., the candidate voltage values) from the replica control logic receiver 305 via lines 345 and may use the calibration values 340 to determine corresponding DFE control voltage values. For example, the interpolation circuit 325 may interpolate a value between two calibration values 340 based on a DFE value indicated by the register 335-*a*, and the interpolation circuit 325 may output the interpolated value to a transport bus 330.

For instance, the interpolation circuit 325 may receive, via the multiplexer 360, a register value of the register 335-*a* corresponding to a first receiver that indicates a DFE value. In an example, the DFE value may correspond to a control voltage (e.g., a calibration value 340) of x millivolts (mV). That is, input of a x mV control voltage into a receiver (e.g., samplers 225 of a receiver) may cause the receiver to apply the DFE value to data. In the example, the indicated DFE value may be between a first DFE value corresponding to a first calibration value 340 (e.g., a minimum calibration value 340 or another calibration value 340) and a second DFE value corresponding to a second calibration value 340 stored at the replica control logic receiver 305. The interpolation circuit 325 may use the calibration values 340 to interpolate and determine the x mV control voltage between the first and second calibration values 340 that will result in the application of the indicated DFE value at the receiver. The interpolation circuit 325 may similarly receive a second register value via the multiplexer 360 and interpolate a corresponding voltage value, and so forth for each register 335.

In some examples, interpolating between calibration values 340 may be performed if a control voltage corresponding to a DFE value indicated via a register is absent from the calibration values 340 (e.g., the candidate values). Alternatively, if the control voltage corresponding to the DFE value is present in the calibration values 340, the interpolation circuit 325 may refrain from performing interpolation for that DFE value and may instead output the corresponding calibration value 340 to the transport bus 330. Accordingly, the interpolation circuit 325 may determine control voltage values for each DFE value indicated by the registers 335, which may be input into the interpolation circuit 325 based on the select signal.

The interpolation circuit 325 may output generated voltage values to the transport bus 330 (e.g., a serial bus 235). The transport bus 330 may output the voltage values to each of the receivers. For example, the transport bus 330 may output a serial indication of all the determined (e.g., interpolated) control voltage values, which may indicate each control voltage value serially (e.g., in order). In some examples, the serial indication may include an indication of the register values output by each respective register 335, for example, to associate the indicated control voltage value with a respective receiver, as described with reference to FIG. 4.

FIG. 4 shows an example of a signaling diagram 400 that supports receiver DFE calibration in accordance with examples as disclosed herein. The signaling diagram 400 illustrates indicating DFE control voltage values to a set of receivers, as described herein with reference to FIGS. 1 through 3. The signaling diagram 400 depicts a calibration circuit 405-*a* and a calibration circuit 405-*b*, which may be examples of the calibration circuit 300 described with reference to FIG. 3, which may be implemented within a memory system 110 as described with reference to FIG. 1. While the signaling diagram 400 illustrates an example where the set of receivers contains three receivers corresponding to a first data channel (e.g., DQ <0>), a second data channel (e.g., DQ <1>), and a third data channel (e.g., DQ <11>), different quantities of receivers and data channels may also be supported in a similar manner as described.

In some examples, the calibration circuit 405-*a* may generate a first set of voltage values (e.g., high DFE voltage values) for a first set of samplers (e.g., high samplers) of the set of receivers, and the calibration circuit 405-*b* may generate a second set of voltage values (e.g., low DFE voltage values) for a second set of samplers (e.g., low samplers) of the set of receivers. The calibration circuit 405-*a* may output the first set of voltage values via a serial bus 410-*a*, and the calibration circuit 405-*b* may output the second set of voltage values via a serial bus 410-*b*. In some examples, the voltage values may be output by the calibration circuit 405-*a* and the calibration circuit 405-*b* in order (e.g., serially), for example, corresponding to an order of the receivers.

In some cases, the voltage values may be indicated along with an indication of the receiver 430 to which the voltage values correspond (e.g., an indication of a register value corresponding to a mode register associated with the receiver 430, an identifier associated with the receiver 430). For example, the calibration circuit 405-*a* may output respective indications of the receivers 430 (e.g., receivers 430-*a* through 430-*c*) to indicate which voltages values correspond to which receivers 430. The respective indications of the receivers 430 may follow or precede the indication of the corresponding voltage values for the receivers 430.

In some examples, the information output by the calibration circuit 405-*a* via the serial bus 410-*a* and the information output by the calibration circuit 405-*b* via the serial bus 410-*b* may be combined and transmitted via a serial bus 410-*c*. In some examples, the information may be serially combined. For example, the information output by the calibration circuit 405-*b* may be appended to the information output by the calibration circuit 405-*a*, or vice-versa. Alternatively, the information may be interleaved, such that information corresponding to a same receiver 430 output by each of the calibration circuit 405-*a* and the calibration circuit 405-*b* may be output consecutively (e.g., information associated with a high DFE control voltage value for the receiver 430-*a* followed by information associated with a low DFE control voltage value for the receiver 430-*a*, or vice versa).

Each receiver 430 may receive the corresponding voltage values via a respective bus receiver 415 (e.g., a bus receiver 205). For example, the receiver 430-*a* may be associated with a bus receiver 415-*a* configured to receive voltage values for the receiver 430-*a* from a serial bus 410. Similarly, a bus receiver 415-*b* may receive information from the serial bus 410-*c* associated with voltage values for the receiver 430-*b* and a bus receiver 415-*c* may receive information from the combined serial bus 410-*c* associated with voltage values for the receiver 430-*c*.

In some examples, the receiver 430-*a* may obtain the voltages (e.g., the DFE control voltages) corresponding to the voltage values, via a ser of DACs 425. For example, the DAC 425-*a* may generate a voltage (e.g., a high DFE control voltage) based on a corresponding voltage value obtained via the bus receiver 415-*a* (e.g., and stored to a register 420-*a*), and the DAC 425-*b* may generate a voltage (e.g., a low DFE control voltage) based on a corresponding voltage value obtained via the bus receiver 415-*a* (e.g., and stored to a register 420-*b*), as described with reference to FIG. 2. The DAC 425-*a* and the DAC 425-*b* may output the generated voltages to the receiver 430-*a* (e.g., to high samplers and low samplers, respectively, of the receiver 430-*a*), and the receiver 430-*a* may perform DFE based on the voltages. Similarly, the receiver 430-*b* may perform DFE based on voltages generated by a DAC 425-*c* and a DAC 425-*d* (e.g., based on corresponding voltage values received using the bus receiver 415-*b* and registers 420-*c* and 420-*d*), and the receiver 430-*c* may perform DFE based on voltages generated by a DAC 425-*e* and a DAC 425-*f* (e.g., based on corresponding voltage values received using the bus receiver 415-*c* and registers 420-*e* and 420-*f*). Accordingly, each receiver 430 may perform DFE according to corresponding voltages as generated by the calibration circuit 405-*a* and the calibration circuit 405-*b*, enabling each receiver 430 to independently perform DFE according to different DFE settings.

Figure 5:
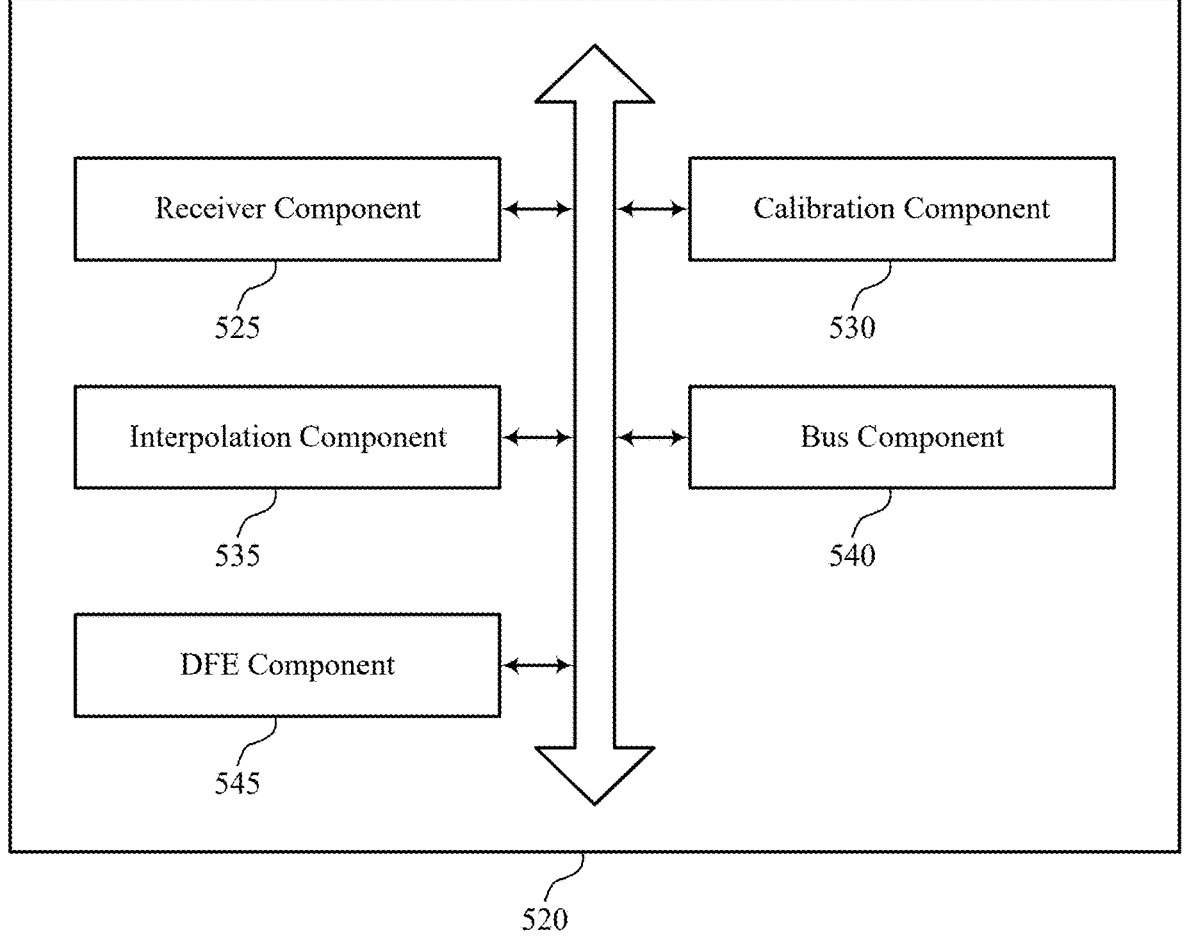
FIG. 5 shows a block diagram of a memory system that supports receiver DFE calibration in accordance with examples as disclosed herein.

FIG. 5 shows a block diagram 500 of a memory system 520 that supports receiver DFE calibration in accordance with examples as disclosed herein. The memory system 520 may be an example of aspects of a memory system as described with reference to FIGS. 1 through 4. The memory system 520, or various components thereof, may be an example of means for performing various aspects of receiver DFE calibration as described herein. For example, the memory system 520 may include a receiver component 525, a calibration component 530, an interpolation component 535, a bus component 540, a DFE component 545, or any combination thereof. Each of these components, or components of subcomponents thereof (e.g., one or more processors, one or more memories), may communicate, directly or indirectly, with one another (e.g., via one or more buses).

The receiver component 525 may be configured as or otherwise support a means for receiving data via a set of receivers. The calibration component 530, which may be an example of the calibration circuits 300 as described with reference to FIG. 3, may be configured as or otherwise support a means for generating, at a calibration circuit, a first set of voltage values associated with DFE at the set of receivers, where the first set of voltage values are candidate voltages for input into the set of receivers that correspond to application of a first set of DFE values to the data. The interpolation component 535 may be configured as or otherwise support a means for determining, at an interpolation circuit based at least in part on the first set of voltage values, a second set of voltage values for input into the set of receivers that correspond to application of a second set of DFE values to the data. The bus component 540 may be configured as or otherwise support a means for outputting, to the set of receivers, signaling that indicates the second set of voltage values, where each voltage value of the second set of voltage values corresponds to a respective receiver of the set of receivers. The DFE component 545 may be configured as or otherwise support a means for performing, at the set of receivers based at least in part on the corresponding voltage values of the second set of voltage values, the DFE to apply corresponding DFE values of the second set of DFE values to the data.

In some examples, to support performing the DFE at a respective receiver of the set of receivers, the DFE component 545 may be configured as or otherwise support a means for generating, using a DAC of the respective receiver, a voltage for input into one or more samplers of the respective receiver, where the voltage is based at least in part on the voltage value of the second set of voltage values corresponding to the respective receiver.

In some examples, the interpolation component 535 may be configured as or otherwise support a means for obtaining, at the interpolation circuit, a set of register values, each register value of the set of register values indicating a respective DFE value of the second set of DFE values and corresponding to a respective receiver of the set of receivers, where determining the second set of voltage values is based at least in part on the set of register values.

In some examples, to support determining a respective second voltage value of the second set of voltage values, the interpolation component 535 may be configured as or otherwise support a means for interpolating, at the interpolation circuit, the respective second voltage value from a first voltage value of the first set of voltage values and a second voltage value of the first set of voltage values based at least in part on a respective DFE value indicated by a respective register value.

In some examples, to support interpolating the respective second voltage value, the interpolation component 535 may be configured as or otherwise support a means for interpolating the respective second voltage value based at least in part on the respective DFE value being absent from the first set of DFE values.

In some examples, to support determining a respective second voltage value of the second set of voltage values, the interpolation component 535 may be configured as or otherwise support a means for determining, at the interpolation circuit, the respective second voltage value to be a voltage value of the first set of voltage values based at least in part on a respective DFE value indicated by a respective register value corresponding to the voltage value.

In some examples, the calibration component 530 may be configured as or otherwise support a means for generating, at a second calibration circuit, a third set of voltage values associated with DFE at the set of receivers. In some examples, the interpolation component 535 may be configured as or otherwise support a means for determining, at a second interpolation circuit based at least in part on the third set of voltage values, a fourth set of voltage values for input into the set of receivers. In some examples, the bus component 540 may be configured as or otherwise support a means for outputting, to the set of receivers, second signaling that indicates the fourth set of voltage values, where each voltage value of the fourth set of voltage values corresponds to a respective receiver of the set of receivers, where the DFE is performed at the set of receivers further based at least in part on the corresponding voltage values of the fourth set of voltage values.

In some examples, to support performing the DFE at a respective receiver of the set of receivers, the receiver component 525 may be configured as or otherwise support a means for generating, via a second DAC of the respective receiver, a voltage for input into one or more samplers of the respective receiver, where the voltage is based at least in part on the voltage value of the fourth set of voltage values corresponding to the respective receiver.

In some examples, the data received via the set of receivers is decoded based at least in part on a set of reference voltages. In some examples, the first set of voltage values generated at the calibration circuit is associated with a first reference voltages of the set of reference voltages and the third set of voltage values generated at the second calibration circuit is associated with a second reference voltage of the set of reference voltages.

In some examples, the signaling that indicates the second set of voltage values is output via a serial bus to the set of receivers.

In some examples, the calibration component 530 may be configured as or otherwise support a means for storing, at the calibration circuit, the first set of voltage values, where determining the second set of voltage values is based at least in part on storing the first set of voltage values.

In some examples, the described functionality of the memory system 520, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 520, or various components thereof, may be implemented at least in part by instructions (e.g., stored in memory, non-transitory computer-readable medium) executable by such at least one processor.

FIG. 6 shows a flowchart illustrating a method 600 that supports receiver DFE calibration in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving data via a set of receivers. In some examples, aspects of the operations of 605 may be performed by a receiver component 525 as described with reference to FIG. 5.

At 610, the method may include generating, at a calibration circuit, a first set of voltage values associated with DFE at the set of receivers, where the first set of voltage values are candidate voltages for input into the set of receivers that correspond to application of a first set of DFE values to the data. In some examples, aspects of the operations of 610 may be performed by a calibration component 530 as described with reference to FIG. 5.

At 615, the method may include determining, at an interpolation circuit based at least in part on the first set of voltage values, a second set of voltage values for input into the set of receivers that correspond to application of a second set of DFE values to the data. In some examples, aspects of the operations of 615 may be performed by an interpolation component 535 as described with reference to FIG. 5.

At 620, the method may include outputting, to the set of receivers, signaling that indicates the second set of voltage values, where each voltage value of the second set of voltage values corresponds to a respective receiver of the set of receivers. In some examples, aspects of the operations of 620 may be performed by a bus component 540 as described with reference to FIG. 5.

At 625, the method may include performing, at the set of receivers based at least in part on the corresponding voltage values of the second set of voltage values, the DFE to apply corresponding DFE values of the second set of DFE values to the data. In some examples, aspects of the operations of 625 may be performed by a DFE component 545 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving data via a set of receivers; generating, at a calibration circuit, a first set of voltage values associated with DFE at the set of receivers, where the first set of voltage values are candidate voltages for input into the set of receivers that correspond to application of a first set of DFE values to the data; determining, at an interpolation circuit based at least in part on the first set of voltage values, a second set of voltage values for input into the set of receivers that correspond to application of a second set of DFE values to the data; outputting, to the set of receivers, signaling that indicates the second set of voltage values, where each voltage value of the second set of voltage values corresponds to a respective receiver of the set of receivers; and performing, at the set of receivers based at least in part on the corresponding voltage values of the second set of voltage values, the DFE to apply corresponding DFE values of the second set of DFE values to the data.

Aspect 2: The method, apparatus, or non-transitory computer-readable medium of aspect 1, where performing the DFE at a respective receiver of the set of receivers includes operations, features, circuitry, logic, means, or instructions, or any combination thereof for generating, using a DAC of the respective receiver, a voltage for input into one or more samplers of the respective receiver, where the voltage is based at least in part on the voltage value of the second set of voltage values corresponding to the respective receiver.

Aspect 3: The method, apparatus, or non-transitory computer-readable medium of any of aspects 1 through 2, further including operations, features, circuitry, logic, means, or instructions, or any combination thereof for obtaining, at the interpolation circuit, a set of register values, each register value of the set of register values indicating a respective DFE value of the second set of DFE values and corresponding to a respective receiver of the set of receivers, where determining the second set of voltage values is based at least in part on the set of register values.

Aspect 4: The method, apparatus, or non-transitory computer-readable medium of aspect 3, where determining a respective second voltage value of the second set of voltage values includes operations, features, circuitry, logic, means, or instructions, or any combination thereof for interpolating, at the interpolation circuit, the respective second voltage value from a first voltage value of the first set of voltage values and a second voltage value of the first set of voltage values based at least in part on a respective DFE value indicated by a respective register value.

Aspect 5: The method, apparatus, or non-transitory computer-readable medium of aspect 4, where interpolating the respective second voltage value includes operations, features, circuitry, logic, means, or instructions, or any combination thereof for interpolating the respective second voltage value based at least in part on the respective DFE value being absent from the first set of DFE values.

Aspect 6: The method, apparatus, or non-transitory computer-readable medium of any of aspects 3 through 5, where determining a respective second voltage value of the second set of voltage values includes operations, features, circuitry, logic, means, or instructions, or any combination thereof for determining, at the interpolation circuit, the respective second voltage value to be a voltage value of the first set of voltage values based at least in part on a respective DFE value indicated by a respective register value corresponding to the voltage value.

Aspect 7: The method, apparatus, or non-transitory computer-readable medium of any of aspects 1 through 6, further including operations, features, circuitry, logic, means, or instructions, or any combination thereof for generating, at a second calibration circuit, a third set of voltage values associated with DFE at the set of receivers; determining, at a second interpolation circuit based at least in part on the third set of voltage values, a fourth set of voltage values for input into the set of receivers; and outputting, to the set of receivers, second signaling that indicates the fourth set of voltage values, where each voltage value of the fourth set of voltage values corresponds to a respective receiver of the set of receivers, where the DFE is performed at the set of receivers further based at least in part on the corresponding voltage values of the fourth set of voltage values.

Aspect 8: The method, apparatus, or non-transitory computer-readable medium of aspect 7, where performing the DFE at a respective receiver of the set of receivers includes operations, features, circuitry, logic, means, or instructions, or any combination thereof for generating, via a second DAC of the respective receiver, a voltage for input into one or more samplers of the respective receiver, where the voltage is based at least in part on the voltage value of the fourth set of voltage values corresponding to the respective receiver.

Aspect 9: The method, apparatus, or non-transitory computer-readable medium of any of aspects 7 through 8, where the data received via the set of receivers is decoded based at least in part on a set of reference voltages and the first set of voltage values generated at the calibration circuit is associated with a first reference voltages of the set of reference voltages and the third set of voltage values generated at the second calibration circuit is associated with a second reference voltage of the set of reference voltages.

Aspect 10: The method, apparatus, or non-transitory computer-readable medium of any of aspects 1 through 9, where the signaling that indicates the second set of voltage values is output via a serial bus to the set of receivers.

Aspect 11: The method, apparatus, or non-transitory computer-readable medium of any of aspects 1 through 10, further including operations, features, circuitry, logic, means, or instructions, or any combination thereof for storing, at the calibration circuit, the first set of voltage values, where determining the second set of voltage values is based at least in part on storing the first set of voltage values.

It should be noted that the aspects described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 12: A memory system, including: a set of receivers configured to receive respective data via respective data channels and perform DFE in association with reception of the respective data; a calibration circuit configured to generate a first set of voltage values as candidate voltages for input into the set of receivers that correspond to application of a first set of DFE values to the data; and an interpolation circuit configured to: determine, based at least in part on generation of the first set of voltage values, a second set of voltage values for input into the set of receivers that correspond to application of a second set of DFE values to the data; and output, to the set of receivers, signaling to indicate the second set of voltage values, where each voltage value of the second set of voltage values corresponds to a respective receiver of the set of receivers that is configured to perform, based at least in part on the corresponding voltage value of the second set of voltage values, DFE to apply a corresponding DFE values of the second set of DFE values to the data.

Aspect 13: The memory system of aspect 12, where each respective receiver of the set of receivers includes: a DAC configured to generate a voltage based at least in part on a corresponding voltage value of the second set of voltage values, and where the respective receiver is configured to perform the DFE based at least in part on the voltage.

Aspect 14: The memory system of any of aspects 12 through 13, further including: a set of registers, each register of the set of registers corresponding to a respective receiver of the set of receivers and configured to output, to the interpolation circuit, a respective register value, where the interpolation circuit is configured to determine a respective voltage value of the second set of voltage values based at least in part on the respective register value.

Aspect 15: The memory system of aspect 14, where to determine a respective second voltage value of the second set of voltage values, the interpolation circuit is configured to interpolate the respective second voltage value from a first voltage value of the first set of voltage values and a second voltage value of the first set of voltage values based at least in part on a respective DFE value indicated by a respective register.

Aspect 16: The memory system of aspect 15, where the interpolation circuit is configured to interpolate the respective second voltage value based at least in part on the respective DFE value being absent from the first set of DFE values.

Aspect 17: The memory system of any of aspects 14 through 16, where the interpolation circuit is configured to determine a respective second voltage value to be a voltage value of the first set of voltage values based at least in part on a respective DFE value indicated by a respective register value corresponding to the voltage value.

Aspect 18: The memory system of any of aspects 14 through 17, further including: a multiplexer coupled with the set of registers and configured to output the respective register values to the interpolation circuit based at least in part on a select signal.

Aspect 19: The memory system of any of aspects 12 through 18, where the memory system further includes: a second calibration circuit configured to generate a third set of voltage values; and a second interpolation circuit configured to: determine, based at least in part on the third set of voltage values, a fourth set of voltage values; and output, to the set of receivers, signaling that indicates the fourth set of voltage values, where each voltage value of the fourth set of voltage values corresponds to a respective receiver of the set of receivers that is configured to perform DFE based at least in part on the corresponding voltage of the fourth set of voltage values.

Aspect 20: The memory system of aspect 19, where each respective receiver of the set of receivers includes: a set of DACs configured to generate a set of voltages based at least in part on corresponding voltage values of the second set of voltage values and fourth set of voltage values, where the respective receiver is configured to perform the DFE based at least in part on the set of voltages.

Aspect 21: The memory system of aspect 20, where the respective data received via the set of receivers is decoded based at least in part on a set of reference voltages, and the first set of voltage values is associated with a first reference voltage of the set of reference voltages and the third set of voltage values is associated with a second reference voltage of the set of reference voltages.

Aspect 22: The memory system of any of aspects 12 through 21, further including: a serial bus coupled with the set of receivers and the interpolation circuit, where the interpolation circuit is configured to output the signaling that indicates the second set of voltage values to the set of receivers via the serial bus.

Aspect 23: The memory system of any of aspects 12 through 22, where the calibration circuit is further configured to store the first set of voltage values, and the interpolation circuit is configured to determine the second set of voltage values is based at least in part on the stored first set of voltage values.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. A conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or may be an indirect conductive path that includes intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component may initiate a change that allows signals to flow between the other components over a conductive path that previously did not permit signals to flow.

A switching component (e.g., a transistor) discussed herein may be a field-effect transistor (FET), and may include a source (e.g., a source terminal), a drain (e.g., a drain terminal), a channel between the source and drain, and a gate (e.g., a gate terminal). A conductivity of the channel may be controlled (e.g., modulated) by applying a voltage to the gate which, in some examples, may result in the channel becoming conductive. A switching component may be an example of an n-type FET or a p-type FET.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which that can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method by a memory system, comprising:
receiving data via a set of receivers;
generating, at a calibration circuit, a first set of voltage values associated with decision feedback equalization at the set of receivers, wherein the first set of voltage values are candidate voltages for input into the set of receivers that correspond to application of a first set of decision feedback equalization values to the data;
determining, at an interpolation circuit based at least in part on the first set of voltage values, a second set of voltage values for input into the set of receivers that correspond to application of a second set of decision feedback equalization values to the data;
outputting, to the set of receivers, signaling that indicates the second set of voltage values, wherein each voltage value of the second set of voltage values corresponds to a respective receiver of the set of receivers; and
performing, at the set of receivers based at least in part on the corresponding voltage values of the second set of voltage values, the decision feedback equalization to apply corresponding decision feedback equalization values of the second set of decision feedback equalization values to the data.

2. The method of claim 1, wherein performing the decision feedback equalization at a respective receiver of the set of receivers comprises:
generating, using a digital-to-analog converter of the respective receiver, a voltage for input into one or more samplers of the respective receiver, wherein the voltage is based at least in part on the voltage value of the second set of voltage values corresponding to the respective receiver.

3. The method of claim 1, further comprising:
obtaining, at the interpolation circuit, a set of register values, each register value of the set of register values indicating a respective decision feedback equalization value of the second set of decision feedback equalization values and corresponding to a respective receiver of the set of receivers, wherein determining the second set of voltage values is based at least in part on the set of register values.

4. The method of claim 3, wherein determining a respective second voltage value of the second set of voltage values comprises:

interpolating, at the interpolation circuit, the respective second voltage value from a first voltage value of the first set of voltage values and a second voltage value of the first set of voltage values based at least in part on a respective decision feedback equalization value indicated by a respective register value.

5. The method of claim 4, wherein interpolating the respective second voltage value comprises:
interpolating the respective second voltage value based at least in part on the respective decision feedback equalization value being absent from the first set of decision feedback equalization values.

6. The method of claim 3, wherein determining a respective second voltage value of the second set of voltage values comprises:
determining, at the interpolation circuit, the respective second voltage value to be a voltage value of the first set of voltage values based at least in part on a respective decision feedback equalization value indicated by a respective register value corresponding to the voltage value.

7. The method of claim 1, further comprising:
generating, at a second calibration circuit, a third set of voltage values associated with decision feedback equalization at the set of receivers;
determining, at a second interpolation circuit based at least in part on the third set of voltage values, a fourth set of voltage values for input into the set of receivers; and
outputting, to the set of receivers, second signaling that indicates the fourth set of voltage values, wherein each voltage value of the fourth set of voltage values corresponds to a respective receiver of the set of receivers, wherein the decision feedback equalization is performed at the set of receivers further based at least in part on the corresponding voltage values of the fourth set of voltage values.

8. The method of claim 7, wherein performing the decision feedback equalization at a respective receiver of the set of receivers comprises:
generating, via a second digital-to-analog converter of the respective receiver, a voltage for input into one or more samplers of the respective receiver, wherein the voltage is based at least in part on the voltage value of the fourth set of voltage values corresponding to the respective receiver.

9. The method of claim 7, wherein the data received via the set of receivers is decoded based at least in part on a set of reference voltages, and wherein the first set of voltage values generated at the calibration circuit is associated with a first reference voltages of the set of reference voltages and the third set of voltage values generated at the second calibration circuit is associated with a second reference voltage of the set of reference voltages.

10. The method of claim 1, wherein the signaling that indicates the second set of voltage values is output via a serial bus to the set of receivers.

11. The method of claim 1, further comprising:
storing, at the calibration circuit, the first set of voltage values, wherein determining the second set of voltage values is based at least in part on storing the first set of voltage values.

12. A memory system, comprising:
a set of receivers configured to receive respective data via respective data channels and perform decision feedback equalization in association with reception of the respective data;

a calibration circuit configured to generate a first set of voltage values as candidate voltages for input into the set of receivers that correspond to application of a first set of decision feedback equalization values to the data; and an interpolation circuit configured to:

determine, based at least in part on generation of the first set of voltage values, a second set of voltage values for input into the set of receivers that correspond to application of a second set of decision feedback equalization values to the data; and output, to the set of receivers, signaling to indicate the second set of voltage values, wherein each voltage value of the second set of voltage values corresponds to a respective receiver of the set of receivers that is configured to perform, based at least in part on the corresponding voltage value of the second set of voltage values, decision feedback equalization to apply a corresponding decision feedback equalization value of the second set of decision feedback equalization values to the data.

13. The memory system of claim 12, wherein each respective receiver of the set of receivers comprises:

a digital-to-analog converter configured to generate a voltage based at least in part on a corresponding voltage value of the second set of voltage values, and wherein the respective receiver is configured to perform the decision feedback equalization based at least in part on the voltage.

14. The memory system of claim 12, further comprising:

a set of registers, each register of the set of registers corresponding to a respective receiver of the set of receivers and configured to output, to the interpolation circuit, a respective register value, wherein the interpolation circuit is configured to determine a respective voltage value of the second set of voltage values based at least in part on the respective register value.

15. The memory system of claim 14, wherein to determine a respective second voltage value of the second set of voltage values, the interpolation circuit is configured to interpolate the respective second voltage value from a first voltage value of the first set of voltage values and a second voltage value of the first set of voltage values based at least in part on a respective decision feedback equalization value indicated by a respective register.

16. The memory system of claim 15, wherein the interpolation circuit is configured to interpolate the respective second voltage value based at least in part on the respective decision feedback equalization value being absent from the first set of decision feedback equalization values.

17. The memory system of claim 14, wherein the interpolation circuit is configured to determine a respective second voltage value to be a voltage value of the first set of voltage values based at least in part on a respective decision feedback equalization value indicated by a respective register value corresponding to the voltage value.

18. The memory system of claim 14, further comprising:

a multiplexer coupled with the set of registers and configured to output the respective register values to the interpolation circuit based at least in part on a select signal.

19. The memory system of claim 12, wherein the memory system further comprises:

a second calibration circuit configured to generate a third set of voltage values; and a second interpolation circuit configured to:

determine, based at least in part on the third set of voltage values, a fourth set of voltage values; and output, to the set of receivers, signaling that indicates the fourth set of voltage values, wherein each voltage value of the fourth set of voltage values corresponds to a respective receiver of the set of receivers that is configured to perform decision feedback equalization based at least in part on the corresponding voltage of the fourth set of voltage values.

20. The memory system of claim 19, wherein each respective receiver of the set of receivers comprises:

a set of digital-to-analog converters configured to generate a set of voltages based at least in part on corresponding voltage values of the second set of voltage values and fourth set of voltage values, wherein the respective receiver is configured to perform the decision feedback equalization based at least in part on the set of voltages.

21. The memory system of claim 20, wherein the respective data received via the set of receivers is decoded based at least in part on a set of reference voltages, and wherein the first set of voltage values is associated with a first reference voltage of the set of reference voltages and the third set of voltage values is associated with a second reference voltage of the set of reference voltages.

22. The memory system of claim 12, further comprising:

a serial bus coupled with the set of receivers and the interpolation circuit, wherein the interpolation circuit is configured to output the signaling that indicates the second set of voltage values to the set of receivers via the serial bus.

23. The memory system of claim 12, wherein the calibration circuit is further configured to store the first set of voltage values, and wherein the interpolation circuit is configured to determine the second set of voltage values is based at least in part on the stored first set of voltage values.

24. A memory system, comprising:

one or more memory devices; and processing circuitry coupled with the one or more memory devices and configured to cause the memory system to:

receive data via a set of receivers;

generate, at a calibration circuit, a first set of voltage values associated with decision feedback equalization at the set of receivers, wherein the first set of voltage values are candidate voltages for input into the set of receivers that correspond to application of a first set of decision feedback equalization values to the data;

determine, at an interpolation circuit based at least in part on the first set of voltage values, a second set of voltage values for input into the set of receivers that correspond to application of a second set of decision feedback equalization values to the data;

output, to the set of receivers, signaling that indicates the second set of voltage values, wherein each voltage value of the second set of voltage values corresponds to a respective receiver of the set of receivers; and perform, at the set of receivers based at least in part on the corresponding voltage values of the second set of voltage values, the decision feedback equalization to apply corresponding decision feedback equalization values of the second set of decision feedback equalization values to the data.

* * * * *